United States Patent [19]
Yang et al.

[11] Patent Number: 5,859,167
[45] Date of Patent: Jan. 12, 1999

[54] CURED POLYESTER PLASTIC COMPOSITIONS DERIVED FROM RECYCLED POLYURETHANES

[75] Inventors: Lau S. Yang, Wilmington, Del.; Diane A. Kooker, Collegeville, Pa.

[73] Assignee: ARCO Chemical Technology, L.P., Greenville, Del.

[21] Appl. No.: 87,584

[22] Filed: Jul. 6, 1993

[51] Int. Cl.$^6$ .......... C08G 18/28; C08G 18/77; C08G 18/10; C08G 18/67
[52] U.S. Cl. .......... 528/73; 521/40; 521/49; 524/555; 525/454; 525/455; 525/460; 528/75
[58] Field of Search .......... 521/40, 49; 524/555; 525/454, 455, 460; 528/73, 75

[56] References Cited

U.S. PATENT DOCUMENTS

| | | | |
|---|---|---|---|
| 2,937,151 | 5/1960 | Broeck et al. | 260/2.3 |
| 3,109,824 | 11/1963 | Heiss | 260/2.3 |
| 3,117,940 | 1/1964 | McElroy | 260/2.3 |
| 4,093,573 | 6/1978 | Ramlow et al. | 52/137 |

FOREIGN PATENT DOCUMENTS 3435014  3/1986  Germany.

*Primary Examiner*—Patrick D. Niland
*Attorney, Agent, or Firm*—Jonathan L. Schuchardt

[57] ABSTRACT

Cured, thermoset plastic articles derived from scrap polyurethanes are disclosed. The polyurethane is converted to a liquified mixture containing digested polyurethane and cyclic, unsaturated anhydride. A Lewis acid then catalyzes insertion of the cyclic, unsaturated anhydride into the polyether backbone of the polyurethane to give a liquid, unsaturated resin. The unsaturated resin can cured with a vinyl monomer in the presence of a free-radical initiator to give a cured, thermoset plastic.

22 Claims, No Drawings

CURED POLYESTER PLASTIC COMPOSITIONS DERIVED FROM RECYCLED POLYURETHANES

FIELD OF THE INVENTION

The invention relates to the manufacture of thermoset plastic articles. Recycled polyurethanes are converted to liquid, unsaturated resins that can be combined with vinyl monomers and cured to give the plastic articles.

BACKGROUND OF THE INVENTION

Polyurethanes, such as flexible and rigid foams, elastomers, sealants, and the like, are usually formulated as crosslinked polymers, so they typically cannot be reclaimed or recycled by simply melting the polymer and remolding it. Recycling of polyurethanes requires chemical conversion of the polymer. It is known, for example, to perform basic hydrolysis of polyurethanes at elevated temperatures to isolate components derived from the polyol, polyisocyanate, and chain extender reactants. Recovery and reuse of these components is complicated by the presence of catalysts, surfactants, fillers, flame retardants, and other additives commonly used to manufacture polyurethanes. The high cost of purification makes this strategy impractical and commercially unattractive.

A more attractive approach avoids purification of the individual components following chemical conversion of the polyurethane. In this strategy, the polyurethane is converted to a liquid form or is dissolved in a liquid polymer. The liquid product is then used to manufacture another polyurethane. U.S. Pat. Nos. 2,937,151, 3,109,824, and 3,117,940, and German Patent DE 3,435,014 illustrate this approach.

In copending application Ser. No. 07/979,760, filed Nov. 23, 1992, we described a new ester insertion process in which a cyclic, unsaturated anhydride inserts randomly into carbon-oxygen bonds of a polyether to give an unsaturated polyetherester resin. Unlike conventional unsaturated polyester resins, the degree of unsaturation in the product can be easily controlled by adjusting the ratio of polyether to cyclic, unsaturated anhydride. Thus, unsaturated polyetherester resins having a wide range of crosslinkabilities can be made from maleic anhydride and a single polyether polyol.

Particularly needed in the art are ways to convert scrap polyurethane foams, elastomers, and the like, directly to useful liquid polymer resins without the need to first isolate polyether polyols from the other components. Ways to convert scrap polyurethanes to polymers other than polyurethanes, such as thermoset plastics, are also needed.

SUMMARY OF THE INVENTION

The invention provides a way to make thermoset plastic articles from scrap polyurethanes without any need to isolate or purify individual polyurethane components. The invention includes a cured, thermoset plastic article, which is the reaction product of a vinyl monomer, a free-radical initiator, and a liquid, unsaturated resin derived from a polyurethane.

The liquid, unsaturated resin is prepared by first heating a polyether-based polyurethane with an unsaturated, cyclic anhydride to form a liquified mixture that contains digested polyurethane. The liquified mixture is then heated in the presence of a Lewis acid to promote insertion of the cyclic, unsaturated anhydride into the polyether backbone of the polyurethane to produce the liquid, unsaturated resin. If desired, the resin is further reacted with a glycol to improve its solubility prior to combining it with the free-radical initiator and vinyl monomer to make the cured, thermoset plastic article.

The invention also includes a thermosettable resin composition. This composition comprises a mixture of the liquid, unsaturated resin as described above, and a vinyl monomer. The thermosettable resin composition can be converted to a cured, thermoset plastic article by adding a free-radical initiator and heating the mixture to effect a cure.

The invention includes a process for converting a polyether-based polyurethane to a cured, plastic article. The process comprises preparing a liquid, unsaturated resin as described above, mixing it with a vinyl monomer, and curing the mixture in the presence of a free-radical catalyst to produce the plastic article.

DETAILED DESCRIPTION OF THE INVENTION

The cured, thermoplastic articles of the invention are the reaction products of a vinyl monomer, a free-radical initiator, and a liquid, unsaturated resin prepared from a polyether-based polyurethane.

Vinyl monomers useful in the invention contain one or more $-CH=CH_2$ groups. Suitable vinyl monomers are those that can react with the liquid, unsaturated resins of the invention under free-radical polymerization conditions to give a cured plastic. Preferred vinyl monomers are vinyl aromatic monomers such as styrene, alkylated styrenes, halogenated styrenes, vinyl naphthalene, and the like, allyl esters of aromatic carboxylic acids, such as diallyl phthalate, allyl benzoate, and the like, and acrylate monomers such as ethyl acrylate, methyl methacrylate, and the like. Mixtures of different vinyl monomers can be used.

Free-radical initiators useful in the invention are those known to those skilled in the art as generally useful for free-radical polymerization, and include peroxide and azo-type initiators. Suitable radical initiators include, but are not limited to, benzoyl peroxide, tert-butyl perbenzoate, tert-butyl peroxide, azobis(isobutyronitrile), and the like, and mixtures thereof. Benzoyl peroxide and tert-butyl perbenzoate are preferred. The amount of free-radical initiator used is preferably an amount greater than about 0.1 wt. % based on the amount of cured plastic article produced.

The liquid, unsaturated resin is prepared by heating a polyether-based polyurethane with an unsaturated, cyclic anhydride to form a liquified mixture that contains digested polyurethane. The liquified mixture is heated in the presence of a Lewis acid to promote insertion of the cyclic, unsaturated anhydride into the polyether backbone of the polyurethane to produce the liquid, unsaturated resin. The thermosettable resin is then prepared by mixing the liquid, unsaturated resin with a vinyl monomer. The weight ratio of liquid, unsaturated resin to vinyl monomer is typically within the range of about 3:1 to about 1:1, preferably within the range of about 2:1 to about 1.2:1.

Suitable polyurethanes are the reaction products of polyethers, polyisocyanates, and water or chain extenders, and include flexible and rigid foams, elastomers, coatings, adhesives, and sealants. The polyurethane must contain some proportion of polyether units in the polymer structure. The polyether portion can be derived from a polyether polyol, an amine-terminated polyether, or any other polyether intermediate useful in the manufacture of polyurethane products. Polyurethanes derived from mixtures of different types of polyethers are suitable.

When polyurethane foam is used as the polyurethane, the foam can be reacted "as is" with the unsaturated, cyclic anhydride. Preferably, the volume of the foam is reduced by any suitable means, including compression at elevated temperature, pulverizing, grinding, or the like, or combinations of these methods.

An unsaturated, cyclic anhydride reacts with the polyurethane. Suitable unsaturated, cyclic anhydrides include maleic anhydride, citraconic anhydride, itaconic anhydride, tetrahydrophthalic anhydride, and the like, and mixtures thereof. Maleic anhydride is preferred.

The amount of unsaturated, cyclic anhydride used varies depending upon the desired degree of unsaturation in the liquid, unsaturated resin. Higher proportions of unsaturated anhydride generally give more highly crosslinked plastic articles. Preferably, the weight ratio of unsaturated, cyclic anhydride to polyurethane used is within the range of about 1:2 to about 2:1. A more preferred range is from about 1:1.5 to about 1.5:1.

Other cyclic anhydrides and diacids are optionally included in combination with the unsaturated, cyclic anhydride. The optional cyclic anhydrides and diacids can be saturated, unsaturated, or mixtures of these. Examples include, but are not limited to, phthalic acid, phthalic anhydride, maleic acid, citraconic acid, adipic acid, itaconic anhydride, maleic anhydride, sebacic acid, and the like, and mixtures thereof. When styrene is the vinyl monomer, it is preferred to include an aromatic anhydride or diacid (such as phthalic anhydride) with the unsaturated, cyclic anhydride because the additional aromatic content in the liquid, unsaturated resin improves its solubility in styrene.

Water is preferably included in the initial heating of the polyurethane with the unsaturated, cyclic anhydride because it accelerates digestion of the polyurethane to form a liquified product and also minimizes sublimation of the cyclic anhydride from the reaction mixture. The amount of water used is preferably within the range of about 1 to about 10 wt. % based on the amount of polyurethane used. A more preferred range is from about 2 to about 3 wt. %.

The initial heating step is preferably performed at a temperature within the range of about 150° C. to about 220° C. A more preferred range is from about 150° C. to about 180° C. Digestion is usually reasonably complete within a few hours, as is evidenced by the solid polyurethane dissolving in the mixture.

A Lewis acid is used in the second heating step to promote insertion of unsaturated, cyclic anhydride molecules into the polyether backbone. Generally, any Lewis acid that promotes insertion can be used. Suitable Lewis acids include, but are not limited to, zinc chloride, zinc bromide, tin(IV) chloride, ferric chloride, antimony pentachloride, aluminum chloride, and the like, and mixtures thereof. Particularly preferred are zinc chloride and zinc bromide. Preferably, the amount used is within the range of about 0.1 to about 5 wt. % based on the amount of liquified reaction mixture containing polyurethane and unsaturated, cyclic anhydride. A more preferred range is from about 0.5 to about 2 wt. %.

The second heating step, which is performed after the Lewis acid is added, is preferably performed at a temperature within the range of about 150° C. to about 220° C. A more preferred range is from about 180° C. to about 200° C.; most preferred is the range from about 180° C. to about 190° C. During this step, unreacted unsaturated, cyclic anhydride molecules insert into the polyether C—O bonds to generate unsaturated polyester linkages. Generally, this step requires several hours of heating to get an adequate degree of insertion. Adequate insertion of the anhydride gives a liquid, unsaturated resin with sufficient crosslinkability to produce a cured plastic article with good strength and toughness.

Preferably, the liquid, unsaturated resin is further reacted with a glycol. Reaction of the liquid, unsaturated resin with a glycol reduces the acidity of the resin, prolongs the shelf life of the resin, and imparts flexibility to the cured plastic article. Suitable glycols are low molecular weight, difunctional compounds. Examples include, but are not limited to, ethylene glycol, propylene glycol, diethylene glycol, dipropylene glycol, tripropylene glycol, 1,4-butanediol, 1,6-hexanediol, 1,3-butylene glycol, 2methyl-1,3-propanediol, and the like, and mixtures thereof. Relatively low molecular weight polyols such as polypropylene glycols having molecular weights up to about 1000 are also suitable, although they are less preferred.

The amount of glycol used is preferably the amount needed to reduce the acid number of the liquid, unsaturated resin to less than about 100. Generally, the amount of glycol used will be within the range of about 5 to about 15 weight percent based on the amount of liquid, unsaturated resin.

The liquid, unsaturated resin and the vinyl monomer are optionally cured in the presence of a reinforcing filler. Any suitable filler can be used, including relatively inexpensive materials such as clay, sand, and other fillers commonly used for applications such as fast-curing concrete. Suitable fillers also include, but are not limited to, glass, chopped glass, fiberglass, calcium carbonate, alumina, silica, magnesium silicate, diatomaceous earth, carbon, titanium dioxide, and the like, and mixtures thereof. Typically, if a filler is included, it will be used in an amount within the range of about 10 to about 70 wt. % based on the total weight of the cured, reinforced plastic article. A more preferred range is from about 30 to about 50 wt. %.

The invention includes a thermosettable resin composition. The composition includes the liquid, unsaturated resin prepared as described above, and a vinyl monomer. This liquid composition can be shipped and stored until needed, and can be cured by adding a free-radical initiator to it and heating to produce a cured, thermoset plastic article.

The invention also includes a process for converting a polyether-based polyurethane to a cured, plastic article. The process comprises preparing a liquid, unsaturated resin as previously described from the polyurethane and unsaturated, cyclic anhydride, mixing the resin with a vinyl monomer, and curing the resin in the presence of a free-radical initiator to produce the cured, plastic article.

The invention provides, for the first time, a way to convert scrap polyurethanes to curable polyetherester resins, and ultimately to thermoset, plastic articles that have some of the properties of cured unsaturated polyesters. The ability to control the crosslinkability of the liquid, unsaturated resin simply by changing the relative amount of unsaturated, cyclic anhydride used gives formulators great control over the ultimate mechanical properties of cured, plastic article.

The following examples merely illustrate the invention. Those skilled in the art will recognize numerous variations that are within the spirit of the invention and scope of the claims.

Pre-treatment of Polyurethane Foams

Polyurethane foam can be used "as is" to make the compositions of the invention. In the following examples, however, the volume of the foam samples is reduced prior to use by heating them in a press at 130° C. and 100 psi for 5 minutes. This process reduces the volume and increases the density of the foam from about 0.017 g/mL to about 0.5 g/mL. The compressed foam is cut into 1"×0.05" strips, and is used without further treatment in the examples below.

EXAMPLE 1

A 500-mL 3-neck round-bottom flask is charged with maleic anhydride (30 g), phthalic anhydride (20 g), and water (2.0 g). The flask is heated using an oil bath to 150° C., and scraps from a flexible slabstock polyurethane foam (50 g, prepared in the usual way from ARCOL F-3020 polyol, product of ARCO Chemical Company, and toluene diisocyanate) is added to the flask. The foam dissolves in the liquid within about 2 h. Zinc chloride (1.6 g) is then added, and the mixture is heated at about 180° C. for 4 h. Propylene glycol (10 g) is added, and the mixture is heated for another 2 h, during which time the acid number decreases from about 150 to about 50 meq/g.

The liquid, unsaturated resin prepared above is cooled to 120° C., is poured into styrene (67 g), and is cooled to room temperature. The styrene/resin solution is combined with 2 wt. % of methyl ethyl ketone peroxide, and 0.5 wt. % of cobalt naphthenate (both based on the total amount of resin solution), and is allowed to cure at room temperature for 18 h. The resulting product is post-cured by heating it at 120° C. for 2 h to give a tough, plastic article having a smooth surface.

EXAMPLE 2

The procedure of Example 1 is repeated, except that 50 g of maleic anhydride are used, and phthalic anhydride is omitted. When the liquid, unsaturated resin is cooled and poured into styrene, the mixture is not clear and homogeneous like the solution in Example 1. However, the mixture can be cured as in Example 1 to give a plastic article.

EXAMPLE 3

The procedure of Example 1 is repeated, except that 25 g of maleic anhydride and 25 g of phthalic anhydride are used. The cured, plastic product is somewhat cheesy, and is difficult to cure compared with the product of Example 1, in which a greater proportion of maleic anhydride is used.

EXAMPLE 4

The procedure of Example 1 is repeated, except that water is omitted from the initial digestion step. The foam/anhydride mixture is heated for 2 h, after which a minor proportion of the foam remains undissolved. In spite of the relatively slow digestion of the foam, the product is successfully converted to a cured, plastic article as previously described.

EXAMPLE 5

The procedure of Example 1 is repeated, except that the liquid, unsaturated resin is not reacted with propylene glycol prior to combining the resin with styrene. The styrene solution of the resin develops a gelled precipitate if allowed to stand over time. The resin is cured in the usual way to give a plastic article that is somewhat more brittle than the product prepared in Example 1.

COMPARATIVE EXAMPLE 6

The procedure of Example 1 is repeated, except that the digested resin is not heated in the presence of zinc chloride. The final product after combination of the resin with styrene and curing is cheesy and soft, and is generally of poor quality compared with the product of Example 1.

COMPARATIVE EXAMPLE 7

The procedure of Example 1 is repeated, except that the digested resin is not heated in the presence of zinc chloride, and the liquid resin is also not reacted with propylene glycol. The finished product is cheesy and crumbles easily compared with the product of Example 1.

EXAMPLE 8

The procedure of Example 1 is repeated, except that the liquid, unsaturated resin is combined with styrene and 170 g of calcium carbonate filler. The product is cured in the usual way to give a reinforced plastic article.

The preceding examples are meant only as illustrations; the scope of the invention is defined by the following claims.

We claim:

1. A cured, thermoset plastic article, said article comprising the reaction product of:
   (a) a vinyl monomer;
   (b) a free-radical initiator; and
   (c) a liquid, unsaturated resin prepared by
      (i) heating a polyether-based polyurethane with an unsaturated, cyclic anhydride to form a liquified mixture that contains digested polyurethane;
      (ii) heating the liquified mixture in the presence of a Lewis acid to promote insertion of the cyclic, unsaturated anhydride into the polyether backbone of the polyurethane to produce a liquid, unsaturated resin.

2. The plastic article of claim 1 wherein the vinyl monomer is selected from the group consisting of vinyl aromatic monomers, allyl esters of aromatic carboxylic acids, acrylate monomers, and mixtures thereof.

3. The plastic article of claim 1 wherein the polyether-based polyurethane and the unsaturated, cyclic anhydride are heated in the presence of water.

4. The plastic article of claim 1 wherein, following reaction of the liquified mixture with the Lewis acid in step (ii), the resulting liquid, unsaturated resin is further reacted with a glycol.

5. The plastic article of claim 1 wherein the heating steps are performed at temperatures within the range of about 150° C. to about 220° C.

6. The plastic article of claim 1 wherein the polyether-based polyurethane is a polyurethane foam.

7. The plastic article of claim 4 wherein the vinyl monomer is styrene, and the unsaturated, cyclic anhydride is maleic anhydride.

8. The plastic article of claim 1 wherein the Lewis acid is selected from the group consisting of zinc chloride and zinc bromide.

9. The plastic article of claim 1 wherein the article includes a reinforcing filler.

10. A thermosettable resin composition, said composition comprising:
    (a) a vinyl monomer; and
    (b) a liquid, unsaturated resin prepared by
       (i) heating a polyether-based polyurethane with an unsaturated, cyclic anhydride to form a liquified mixture that contains digested polyurethane;
       (ii) heating the liquified mixture in the presence of a Lewis acid to promote insertion of the cyclic, unsaturated anhydride into the polyether backbone of the polyurethane to produce a liquid, unsaturated resin.

11. The composition of claim 10 wherein the vinyl monomer is selected from the group consisting of vinyl aromatic monomers, allyl esters of aromatic carboxylic acids, acrylate monomers, and mixtures thereof.

12. The composition of claim 10 wherein the polyether-based polyurethane and the unsaturated, cyclic anhydride are heated in the presence of water.

13. The composition of claim 10 wherein, following reaction of the liquified mixture with the Lewis acid in step (ii), the resulting liquid, unsaturated resin is further reacted with a glycol.

14. The composition of claim 10 wherein the heating steps are performed at temperatures within the range of about 150° C. to about 220° C.

15. The composition of claim 10 wherein the polyether-based polyurethane is a polyurethane foam.

16. The composition of claim 10 wherein the Lewis acid is selected from the group consisting of zinc chloride and zinc bromide.

17. A process for converting a polyether-based polyurethane to a cured, plastic article, said process comprising:
 (a) preparing a liquid, unsaturated resin by
  (i) heating the polyether-based polyurethane with an unsaturated, cyclic anhydride to form a liquified mixture that contains digested polyurethane;
  (ii) heating the liquified mixture in the presence of a Lewis acid to promote insertion of the cyclic, unsaturated anhydride into the polyether backbone of the polyurethane to produce a liquid, unsaturated resin;
 (b) mixing the liquid, unsaturated resin with a vinyl monomer; and
 (c) curing the resin in the presence of a free-radical initiator to produce the cured, plastic article.

18. The process of claim 17 wherein the polyether-based polyurethane and the unsaturated, cyclic anhydride are heated in the presence of water.

19. The process of claim 17 wherein, following reaction of the liquified mixture with the Lewis acid in step (ii), the resulting liquid, unsaturated resin is further reacted with a glycol.

20. The process of claim 17 wherein the heating steps are performed at temperatures within the range of about 150° C. to about 220° C.

21. A method of using a liquid, unsaturated resin prepared from the reaction of a polyether-based polyurethane and a cyclic, unsaturated anhydride, said method comprising reacting the liquid, unsaturated resin with a vinyl monomer in the presence of a free-radical initiator to produce a cured, plastic article.

22. The method of claim 21 wherein the liquid, unsaturated resin and the vinyl monomer are reacted in the presence of a reinforcing filler.

\* \* \* \* \*